(12) United States Patent
Ayyagari

(10) Patent No.: US 7,961,736 B2
(45) Date of Patent: *Jun. 14, 2011

(54) CONVERGENCE AND CLASSIFICATION OF DATA PACKETS IN A CENTRALIZED COMMUNICATION SYSTEM

(75) Inventor: Deepak Ayyagari, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1028 days.

This patent is subject to a terminal disclaimer.

(21) Appl. No.: 10/663,866

(22) Filed: Sep. 15, 2003

(65) Prior Publication Data

US 2004/0073939 A1    Apr. 15, 2004

Related U.S. Application Data

(60) Provisional application No. 60/414,152, filed on Sep. 26, 2002.

(51) Int. Cl.
 *H04L 12/28* (2006.01)
(52) U.S. Cl. .......... 370/395.3; 370/395.42; 709/240
(58) Field of Classification Search ..... 370/389–395.43, 370/395.51, 395.52, 420, 463, 469
See application file for complete search history.

(56) References Cited

U.S. PATENT DOCUMENTS

| | | | |
|---|---|---|---|
| 4,841,456 A * | 6/1989 | Hogan et al. ............... | 702/119 |
| 5,216,675 A | 6/1993 | Melliar-Smith et al. | |
| 5,507,359 A | 4/1996 | Wada | |
| 5,555,266 A | 9/1996 | Buchholz et al. | |
| 5,570,359 A | 10/1996 | Nguyen | |
| 5,928,324 A | 7/1999 | Sloan | |
| 6,041,359 A | 3/2000 | Birdwell | |
| 6,148,349 A | 11/2000 | Chow et al. | |
| 6,199,136 B1 * | 3/2001 | Shteyn .................... | 710/305 |
| 6,272,145 B1 * | 8/2001 | Malkin .................... | 370/432 |
| 6,873,624 B1 | 3/2005 | Johansson et al. | |
| 7,835,365 B2 | 11/2010 | Ayyagari | |
| 2001/0003804 A1 | 6/2001 | Papadopoulos et al. | |
| 2001/0018712 A1 | 8/2001 | Swales et al. | |
| 2001/0048663 A1 * | 12/2001 | Kodaira ..................... | 370/230 |
| 2002/0032806 A1 * | 3/2002 | Machin et al. ............ | 709/328 |
| 2002/0181401 A1 * | 12/2002 | Hagirahim et al. ......... | 370/236 |

(Continued)

FOREIGN PATENT DOCUMENTS

DE    4201361    8/1992

OTHER PUBLICATIONS

Andrew S. Tanenbaum, "Computer Networks", Third Edition, 1996 (hereinafter Tanenbaum), p. 345, 380, 480, 482-490, 548, and 577.*

(Continued)

*Primary Examiner* — Jianye Wu
(74) *Attorney, Agent, or Firm* — Marger Johnson & McCollom, P.C.

(57) ABSTRACT

A method of converting application data to transport data in a power line communication system includes receiving application data from an application in a device through a service access point. The connection type and connection specification for the application data is then analyzed to determine if a connection exists for the application data. If a connection exists for the application data, mapping the application data is mapped into transport data.

18 Claims, 10 Drawing Sheets

U.S. PATENT DOCUMENTS

| | | | |
|---|---|---|---|
| 2003/0093563 A1* | 5/2003 | Young et al. | 709/245 |
| 2003/0103521 A1* | 6/2003 | Raphaeli et al. | 370/445 |
| 2003/0182291 A1* | 9/2003 | Kurupati et al. | 707/100 |
| 2004/0062229 A1 | 4/2004 | Ayyagari et al. | |
| 2004/0073939 A1* | 4/2004 | Ayyagari | 725/110 |
| 2004/0081201 A1* | 4/2004 | Simonnet et al. | 370/469 |
| 2004/0138834 A1* | 7/2004 | Blackett et al. | 702/62 |
| 2004/0153545 A1* | 8/2004 | Pandya et al. | 709/226 |
| 2004/0233907 A1 | 11/2004 | Hundscheidt et al. | |

OTHER PUBLICATIONS

W. Richard Stevens, "UNIX Netwrok Programming", 1990, p. 267-268.*

Andrew S. Tanenbaum, "Computer Networks", Third Edition, 1996 (hereinafter Tanenbaum), p. 413, 414.*

W. Richard Stevens, "UNIX NetWrok Programming", 1990, p. 269-275.*

W. Richard Stevens, "UNIX Netwrok Programming", 1990, p. 269-275, 282-283.*

W. Richard Stevens, "UNIX Netwrok Programming", 1990, p. 240, 260, 266-274, 283.*

Andrew S. Tanenbaum, "Computer Networks", Forth edition, Aug. 9, 2002, Section 5.1.3, 6.1.3, 6.1.4, 7.4, 7.4.8.*

Andrew S. Tanenbaum, "Computer Networks", Forth edition, Aug. 9, 2002, Section 6.5..4, 7.4.4, 8.6.2.*

Andrew S. Tanenbaum, "Computer Networks", Forth edition, Aug. 9, 2002, Section 4.3.3.*

Tanenbaum, Andrew; *Computer Networks*; Aug. 31, 2002; Prentice Hall, New Jersey; pp. 481-486 and 492-497.

Notice of Allowance and Fee(s) Due; Determination of Patent Term Adjustment; Notice of Allowability with accompanying Examiner's comments on allowable subject matter, all dated Jul. 7, 2010, in U.S. Appl. No. 10/663,406, filed Sep. 15, 2003, Now U.S. Pat No. 7,835,365 B2.

* cited by examiner

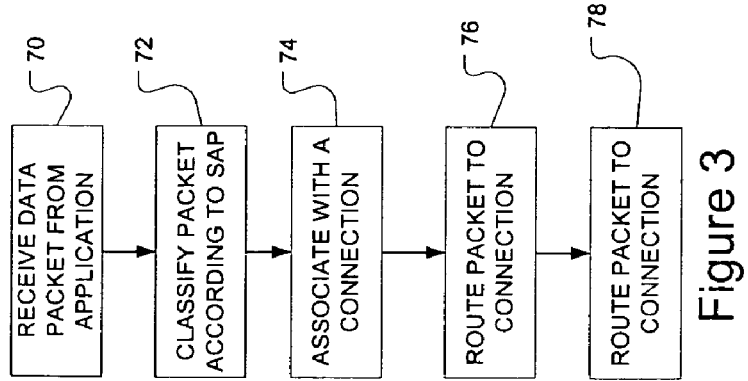
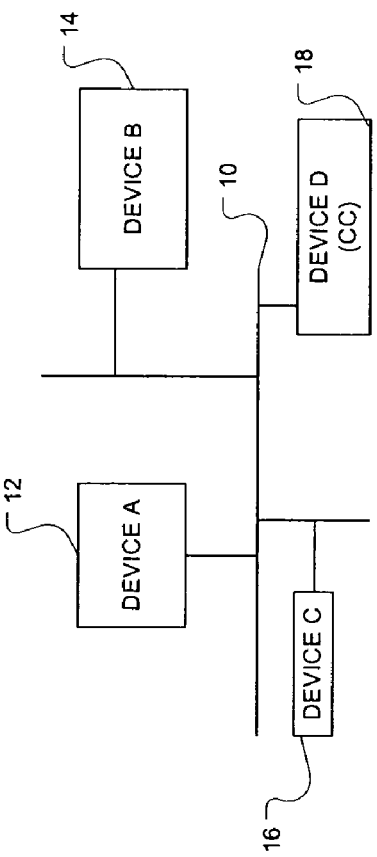
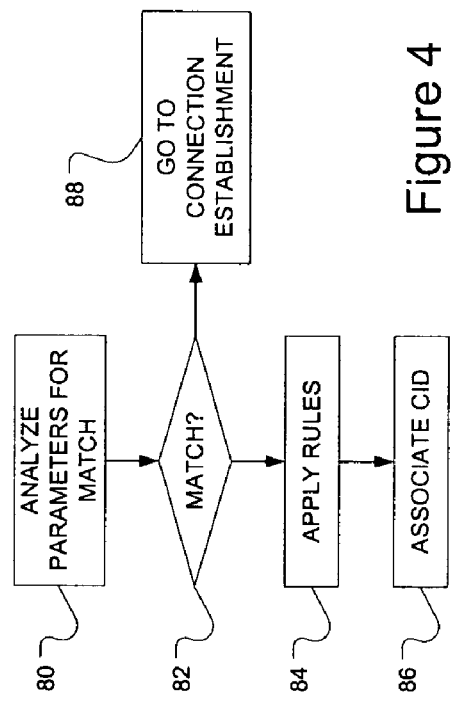

CONVERGENCE AND CLASSIFICATION OF DATA PACKETS IN A CENTRALIZED COMMUNICATION SYSTEM

RELATED APPLICATION

This application is a continuation of U.S. Provisional Application No. 60/414,152 filed Sep. 26, 2002, and claims priority thereto.

BACKGROUND

The design of communications systems has traditionally been based upon the Open Systems Interconnect (OSI) specification proposed by the International Standards Organization (ISO). The OSI Model partitions functions into 7 protocol layers. The definition of the layers is typically somewhat flexible, but the overall framework is a helpful reference in which to discuss communication systems.

In the powerline system under consideration, 4 of the 7 layers are of interest; the application layer; the transport layer; the medium access layer (MAC) and the physical layer. The application layer deals with protocols for the applications running on the individual devices within the network that the communication system is designed to support. These applications may include video applications such as high and standard definition TV, high quality audio, and Internet Protocol applications, among many others. The support of these applications requires that the communication system support high data rates, and protocol mechanisms to specify, monitor and control the quality of service made available to the application data streams.

The transport layer typically consists of the protocols and methods that are responsible for peer-to-peer transport of application data between devices. These functions may include creation of new packets/frames, definition of logical communication mechanisms such as connections or flows, specify packet-oriented or connection-oriented architecture for transport and define quality of service parameters as well as enforcing them, among other functions. The MAC layer supports the transport layer with such things as acknowledgements for reliable packet delivery, in-sequence packet delivery, multiplexing of connections, etc. The physical layer involves the digital signal processing for the digital transfer of packets between devices. For purposes of this discussion, the MAC layer and the physical layer are only important in how they interact with the transport layer.

As mentioned above, the transport layer specifies whether an architecture is a connection-less architecture, or a connection-oriented architecture. The Internet Protocol (IP) is an example of a connection-less architecture. Packets are transmitted from source to destination along one of several possible routes, where there is generally no pre-definition of what the route may be. Asynchronous Transfer Mode (ATM) is an example of a connection-oriented architecture. ATM systems define a logical communication link between a source and destination(s) called permanent virtual circuits (PVC).

BRIEF DESCRIPTION OF THE DRAWINGS

The invention may be best understood by reading the disclosure with reference to the drawings, wherein:

FIG. 1 shows an embodiment of a centralized communication system.

FIG. 3 shows a flowchart of an embodiment of a method to transmit data in a centralized communication system.

FIG. 4 shows a flowchart of an embodiment of a method to classify a data packet in a centralized communication system.

DETAILED DESCRIPTION OF THE EMBODIMENTS

Figure 2:
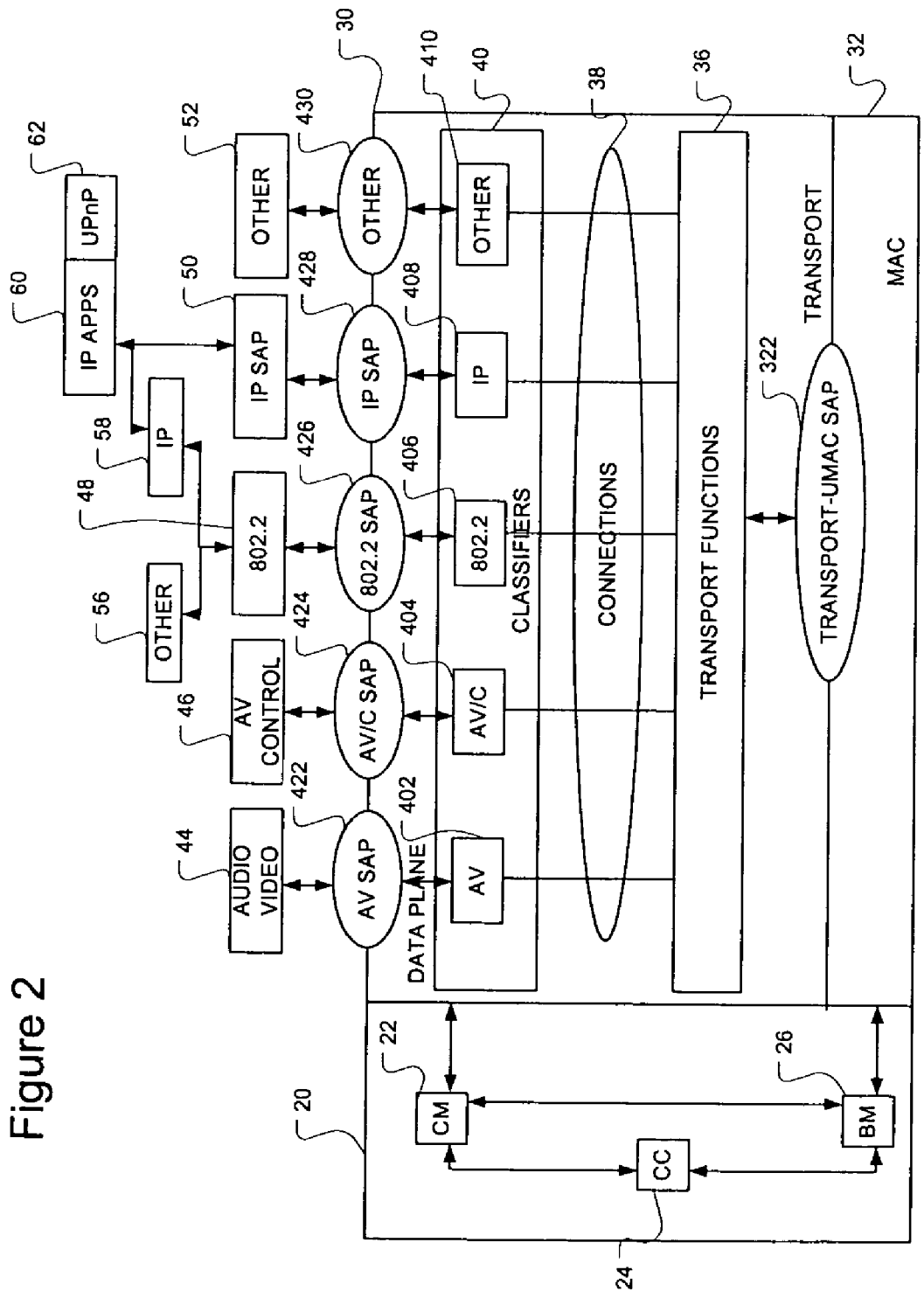
FIG. 2 shows an embodiment of a device usable in a centralized communication system.

A centralized communication system, or centralized network, as those terms are used here is a network or communications system that relies upon some device to control connections in the system or network. For example, a power line communication (PLC) network is shown in FIG. 1.

In the example of FIG. 1, the activity of every device in the network is controlled by a central entity called the Central Coordinator (CC). Alternative systems are distributed in nature and such systems do not have a CC. There are two entities in the PLC network: Devices and Central Coordinator. Any device can function as the Central Coordinator provided it has the required capabilities. The CC has an entity called the CBWM or Central Bandwidth Manager (CBWM) that determines the amount of bandwidth or transmission capacity allowed each device in the PLC network by the CC. The CC may also embody other functions as such maintaining overall timing and synchronization in the network, authorization of devices to access the network, etc. The devices communicate with each other via the network of power lines in the building/home.

In the example of FIG. 1, device D 18 has been designated as the central coordinator (CC). This merely means that device D has the capability to perform the functions of the central coordinator. The network 10 may be a PLC network, as an example, but may be any type of centralized network. One possible example of a centralized network is a home PLC network of audiovisual equipment and devices. For example, device a 12 may be a television, device B may be a video cassette recorder, device C 16 may be the monitor attached to a personal computer connected to the Internet, and device D a set-top box connected to a cable system.

The design of telecommunications systems has traditionally been based on the OSI (Open Systems Interface) specification prescribed by the International Standards Organization (ISO). The OSI model proposes a partitioning of functions into 7 distinct protocol layers. Though the exact definition of these layers is open to interpretation they present a useful framework in which to discuss system functionality. The 4 main layers of interest in a PLC system are the Application Layer, Transport Layer, Medium Access layer and the Physical Layer. This invention does not deal with these functions of the Central Coordinator.

The Application Layer deals with the applications that the Power Line Communication System is designed to support. These applications may include Video (High Definition Television HDTV, Standard Definition Television (SDTV)), High quality audio, IP applications with quality of service (QoS) requirements and other applications. Such a varied application mix requires a communication system that can support adequately high data rates and protocol mechanisms to specify, monitor and control the quality of service made available to the application data streams.

The Transport Layer consists of the protocols and methods that are responsible for peer-peer transport of application data between devices. The functions of the Transport Layer include, but are not limited to, framing, establishment and management of logical communication channels between peer entities like connections or flows, packet and circuit-oriented applications convergence functions for supporting both circuit and packet oriented applications and protocols over the PLC protocol stack, define quality of service (QoS) parameters for application data, concatenation and fragmentation of application packets, delay compensation for audio and video streaming applications and monitoring/enforcing the QoS parameters.

The MAC Layer provides functions required by the transport System such as acknowledgements for reliable packet delivery, in-sequence packet delivery, multiplexing of connections, concatenation and fragmentation of packets etc. These functions will be used at the discretion of the Transport layer manager. The PHY layer involves the digital signal processing systems for digital transfer of packets between devices. The Transport Layer is designed to work with any Physical layer support connection-oriented services.

The communication link carrying application specific data between two devices in a PLC network will be referred to here as connection. A connection is a bi-directional logical association between the Transport Systems/layers of two or more devices, exclusively carrying application data. connections are also called traffic logical channels. A device can support multiple connections simultaneously with another device or group of devices. A connection exists only between two communicating devices and is not used for communication with the central coordinator. A device might also be the CC and in such a case the device may set up connections.

As part of supplying convergence in the centralized communication system, the devices are provided with service access points. Each service access point is specific to a particular kind of data, and may also be associated with either a connection-oriented protocol, like PLC networks, or a connectionless protocol, such as Internet Protocol. Generally, when an application is installed on a device, the service access point for the type of data produced by that application would be associated with the application.

This association allows the transport layer to further analyze data received from the application for transport. Referring to FIGS. 2 and 3, it is possible to see how providing the interface between different types of data and the centralized communications system allows the communications on the system to converge. The transport layer receives application data from the applications, which may be connection-oriented or connectionless oriented. Connection-oriented and connectionless applications expect different services to be made available to it from the lower layers in the device. The transport layer translates the application data to transport data, where transport data is the application data transformed into appropriate data packets for transmission across the PLC. This is accomplished by mapping the application data into the appropriate transport format for a particular connection, the PLC being a connection-oriented system. Connection-oriented applications may also have different expectations of services from the lower layers, even though they are connection-oriented in a similar fashion as the transport system. This data may need to be translated as well.

Having provided specific service access points and associated those with the applications on the device, data can be received at the transport layer from an application at 70. Classification rules are defined for each service access point, such as when a connection between the current device and another device is established for exchange of IP data. A rule would be defined for the destination IP address, such that a packet with that address would be routed to a particular connection, the connection between the current device and the destination device.

At 72, the packet would be classified according to the SAP and the rules applied. This provides an association with a connection at 74. Typically, the rules will have a predefined set of parameters associated with a connection identifier. When a packet is determined to match those predetermined parameters, the packet is associated with that connection identifier. The packet is then routed to whatever port on the device is maintaining the connection at 76, and the packet is transmitted at 78.

The classification process is shown in more detail in FIG. 4. It is the classification process that results in a packet from an application being routed to the correct destination from the current device. At 80, the parameters are analyzed for a matching set in the rules. At 82, the existence of a match is determined. If no match exists, the process goes to connection establishment, discussed in more detail later. If a match does exist, the rules for that match are applied at 84 and the connection identifier (CID) is associated at 86. The establishment of the connection rests heavily upon the CSPEC and CTYPE, and the mapping of the data into the appropriate format from the applications relies heavily upon the service access point. Each access point will be addressed individually below.

AV data transported directly over the communication system is passed across the AV Service Access Point (AV-SAP) to the transport layer. This embodiment of the interface uses a transport layer to application layer send request, send confirm and receiving indicator primitives TLIF_SEND_REQ, TLIF_SEND_CNF and TLIF_RECEIVE_IND to communicate the user data and transmission status over the AV-SAP.

AV traffic will typically be sent over connections that have been pre-established by the application. The connection is usually established with a request from the connection manager to the application layer (CMIF_CONNECT_REQ) primitive that defines the type of connection and its QoS requirements. If the connection is properly established, the AV-SAP port will accept data to send and deliver received data over this SAP.

AV Control data transported directly over the communication system is passed across the AV Control Service Access Point (AVC-SAP) to the transport layer. This interface uses the transport layer to application interface primitives to communicate the user data and transmission status over the AVC-SAP.

AV Control traffic is typically sent over connections that have been pre-established by the application. The connection is established using a connection manager to application layer primitive that defines the type of connection and its QoS requirements.

IP traffic may be transported directly over the communication system. Typically, power line communication systems (PLCs) are connection-oriented, while IP is a connectionless protocol. IP traffic does not expect a dedicated connection in the lower layers of the communication system and therefore the data to be transported must be translated into connection oriented formats. In this case, the IP protocol stack transports its IP packets across the IP Service Access Point (IP-SAP). This interface uses the transport layer to application interface layer primitives to communicate the user data and transmission status over the IP-SAP.

As mentioned above, IP is a connectionless protocol while PLCs are inherently connection oriented. The IP protocol stack can rely on the transport layer to setup connections to the destinations devices as needed by requesting this service when it binds to the PLC-AV IP-SAP. The process of binding is that of informing the CM that an application is attaching to a particular transport layer port. Some traffic types may have a default transport layer port associated with them. AV and AV/C traffic do not typically have default ports, as there could be several of these streams in a device. The application typically requests the port number to which the stream binds. Alternatively, the CM could assign a port.

Applications still have the ability to control the routing of IP traffic over specific connections (with QoS) by configuring the transport layer classifier to detect the IP packets of interest The classifier will then deliver these packets to the proper connection.

ARP (Address Resolution Protocol) traffic may be transported directly over the PLC system. In this case, the ARP protocol stack interfaces with the PLC transport layer and transports its ARP packets across the ARP Service Access Point (ARP-SAP). The ARP_SAP is similar to the IP-SAP.

802.2 traffic may be transported directly over the PLC. In this case, the 802.2 protocol stack transports its packets across the 802.2 Service Access Point (802.2-SAP). This interface uses the send request, confirm request and receive indicator primitives to communicate the user data and transmission status over the 802.2-SAP.

Using these SAPs, then, the powerline communication system can receive data from both connection-oriented applications and connectionless applications and map them into formats that are transportable across the PLC. This mapping function relies upon identifying the SAP through which an application arrived at the transport layer, as well as being able to classify the data. The identified SAP and classification application allow for the data to be mapped to the proper connection, through analysis of the connection type (CTYPE) and connection specification (CSPEC).

AV applications and IP applications have entirely different QoS requirements. It is therefore desirable for the MAC Transport Protocol to differentiate between the types of connections. A connection has a unique flow specification that describes the QoS attributes and guarantees required by the application using the connection. Each connection has a connection Type (CTYPE) and a globally unique connection ID (CID). The CTYPE is based on the kind of Bandwidth scheduler used by the CBWM function in the Central Coordinator to allocate BW to the connection. In one embodiment, the connection Type may be identified by 4-bit field defined as follows:

| Connection/Traffic Logical Channel Type | CTYPE | Description |
| --- | --- | --- |
| 1. Continuous Grant | 0b0000 | Applications such as HDTV, SDTV and audio |
| 2. Periodic Grant | 0b0001 | Isochronous IP applications such as VoIP |
| 3. Priority Aperiodic Grant | 0b0010 | High priority: Control protocols for AV such as IEEE 1394 AV/C Specification, Low Priority: Best Effort IP applications such as WWW and FTP |
| 4. Reserved | 0b0011-1111 | Reserved for future use. |

A global identifier assigned by the CC at the time of connection Set-up uniquely identifies connections. In some embodiments of the invention, the connection ID (CID) may be used for by the Transport System for classification of packets from IP and non-IP applications to Traffic Logical Channels or connections, and to request bandwidth allocation for a connection via the MAC from the CC. The CC may use the CID to make a bandwidth allocation to the connection. The CM may use the CID to renegotiate allocations with the CC, or for the CC to make new allocations when the QoS of the connection is violated. The CC or the CM may use the CID to maintain statistics such as throughput and delay. The MAC may use the CID to perform the functions requested by the Transport Layer and to maintain the mapping of the connection to the BW allocation as provided by CC.

Communications traffic between devices, regardless of the type of grant, will involve messages between peer devices. More specifically, the messages will carry application data between the transport layers of the peer devices.

While there are several possibilities for transport layer message formats (transport layer) two embodiments are discussed here. These will be referred to here as transport layer Format 1 and transport layer Format 2.

An example message structure for transport layer 1 is shown below. This format may be used for all uni-cast application data transmissions within the PLC networks. Generally, this format should not be used for application data that is bridged, broadcast (BCAST) or multicast (MCAST). It may be intended only for unicast application data transmissions.

| Length (2B) | IID (2B) | SEQN (2B) | TS (2B) | C/F (1B) | Payload (0-1525B) |
| --- | --- | --- | --- | --- | --- |
| Variable Length 11-1536 Byes | | | | | |

The fields for this message format are as follows. Length is a two-byte field specifying the number of bytes in the packet, including the length bytes themselves. The range of values of the length field is 11 to 1536 bytes. The connection ID (CID) field is a two-byte field that identifies the connection to which the message carrying application data payload belongs. The first four bits of the CID field are the ID Type. ID Type is of value 0 for uni-cast and MCAST connections and ID Type is of value 1 for BCAST connections. The lower 12 bits may take values from 000-FFF for both ID Types. The protocol sequence number (SEQN is a two-byte sequence number. SEQN is a positive integer that is incremented modulo N (where (N−1) is the maximum value the field can represent) for every packet transmitted with the associated CID. The transport layer Message always contains the SEQN field and this field is left unmodified in the UM-LM primitive. Note that SEQN is associated with the CID and that the SEQN is unique only across packets containing the same CID.

In addition, the transport layer appends a Time Stamp to each packet. The Time Stamp is the time reference provided by the TSF function at the time the transport layer message is created. The Time Stamp is primarily used to calculate the Time to Die in the UMAC for each packet. The Time Stamps may also be used for determining the jitter and delay introduced by transmission of the packet from peer-peer transport layers, deriving a measure of the message throughput for the connection, enabling the transport layer/application layer to compensate for delay/jitter by smoothing out the traffic stream when delivering the received packets to the application (Compensation) and other implementation-specific purposes.

The Concatenation/Fragmenting field is a 1-byte header field indicating whether the transport layer message uses transport layer Format 1 or transport layer Format 2. Additional bits in this field are used to indicate whether the message contains concatenated application packets or fragmented application packets. The format of this field is shown below.

| Bit in C/F | Description |
| --- | --- |
| b0-b1 | Indicates transport layer Formats<br>00: transport layer Format 1<br>01: T1 Format 2<br>10-11: Reserved |
| b2 | Concatenation<br>0: No Concatenated packets in this transport layer message<br>1: Concatenated packets in this transport layer message |
| b3 | Start Fragment: Set to 1 only if the transport layer message carries last fragment (end of application packet) else set to 0 |
| b4 | End Fragment: Set to 1 if transport layer message carries first fragment (beginning of application packet), else set to 0 |
| b5-b7 | Reserved |

If a transport layer message is not carrying fragmented application packets, nor is it carrying concatenated packets (both the Concatenation and Fragmentation bits in CINFO for the connection are set to 0) then b3 and b4 must both be set to 1 and b2 must be set to 0. The C/F field MUST be present in all transport layer messages. If b3 and b4 are both set to 0 then this means that the transport layer message carries a fragment that is neither the beginning nor the end of the application packet.

Finally, for this example, the payload field contains the encapsulated AV, AV\C, IP or other application data. The maximum length of the payload is 1525 bytes.

A second message format may be better used for data that is bridged and for application data that are BCAST or MCAST.

sage Format 2 include the source MAC, the 6-byte unique MAC address of the device that is generating the transport layer message. The Source DEV may or may not be a PLC DEV. Also included is a destination MAC, the unique 6 byte MAC address of the destination DEV that is receiving the transport layer message. The destination DEV may or may not be a PLC device.

The prototype field is the protocol identifier carried in the broadcast and bridged messages. For messages originating on the PLC network, this value is the same as the Protocol Type field used in the connection request messages sent to the CM. For messages bridged off of an Ethernet connection into the PLC, the value in this field comes from the Ethernet Type field.

An embodiment of a device capable of utilizing the message formats discussed above is shown in FIG. 2, already discussed in general terms. AV 44 data transported directly over PLC-AV is passed across the AV Service Access Point (AV-SAP) 422 to the Transport Layer 30. This interface communicates the user data and transmission status over the AV-SAP. AV traffic is always sent over connections that have been pre-established by the application. The connection is established with a request that defines the type of connection and its QoS requirements. If the connection is properly established, the AV-SAP port will accept data to send and deliver received data over this SAP.

AV Control data 46 transported directly over PLC-AV is passed across the AV Control Service Access Point (AVC-SAP) 424 to the Transport Layer 30. AV Control traffic is usually sent over connections that have been pre-established by the application. The connection may be established with a connection request that defines the type of connection and its QoS requirements.

IP traffic 50 may be transported directly over PLC-AV. In this case, the IP protocol stack transports its IP packets across the IP Service Access Point (IP-SAP) 428. IP is a connectionless protocol while PLC-AV is inherently connection oriented. The IP protocol stack can rely on the PLC-AV Transport Layer to setup connections to the destinations devices as needed by requesting this service when it binds to the PLC-AV IP-SAP. Applications still have the ability to control the routing of IP traffic over specific connections, with QoS, by configuring the transport layer classifier to detect the IP packets of interest The classifier 40 will then deliver these packets to the proper connection.

Address Resolution Protocol (ARP) traffic may be transported directly over the PLC-AV system. In this case, the ARP protocol stack interfaces with the PLC transport layer and transports its ARP packets across the ARP Service Access Point (ARP-SAP), defined here as "Other" 430. In every other way, the ARP_SAP is similar to the IP-SAP. Similarly, 802.2 traffic 48 may be transported directly over PLC-AV. In this case, the 802.2 protocol stack transports its packets across the 802.2 Service Access Point (802.2-SAP) 426.

| Length (2B) | CID (2B) | SEQN (2B) | TS 2B) | C/F (1B) | Source MAC (6B) | Dest. MAC (6B) | Proto Type (2B) | Payload (0-1525B) |
| --- | --- | --- | --- | --- | --- | --- | --- | --- |
| Variable Length 11-1550 Bytes | | | | | | | | |

Transport layer Format 2 contains all the fields as defined above for transport layer Format 1 and some additional fields as defined below. Additional Fields in transport layer Mes- The data travels from the various SAPs to the classifiers, contained at 40. Each type of data has its own classifier. The classifiers map incoming application data packets into a connection. If a connection does not exist, the classifiers communicate the classification parameters to the CM and request connection establishment and CID assignment.

The CM generates a CSPEC in the format described below and attempt to establish a connection through communication with the central coordinator. There is a PLC Classifier defined for each PLC transport layer SAP. The Classifiers consists of Classifications Parameters and Classification Rules.

The classifiers for each SAP operate based on a set of rules that are provided by the CM. Each rule consists of a set of matching criteria or parameters to apply to a packet, a rule priority and a connection Identifier (CID). If a packet delivered to a classifier matches a rule, then it is sent over the referenced CID of that rule.

The functions of the PLC-AV Classifier are to map incoming application data packets into a connection. If a connection does not exist, the classifiers communicate the classification parameters to the CM and request connection establishment and CID assignment. The CM must generate a CSPEC in the format described above and attempt to establish a connection through communication with the central coordinator. There is a PL-CAV Classifier defined for each PLC-AV transport layer SAP.

The Classifiers for each SAP operate based on a set of rules that are provided by the CM. Each rule consists of a set of matching criteria or parameters to apply to a packet, a rule priority and a CID. If a packet delivered to a classifier matches a rule, then it is sent over the referenced CID of that rule.

Several rules may have the same CID. The classifier uses the priority of each rule to determine the order in which rules are applied to a packet. If no rule matches a given packet, the packet may be discarded or the CM may attempt to setup a new connection to carry the packet, depending on the action requested in the CMIF_BIND_REQ primitive.

| Rule Composition | |
|---|---|
| Field Name | Description |
| Rule Priority | The relative priority of this rule to all other rules for a classifier at a particular transport layer SAP. |
| CID | The CID associated with this rule. Packets that match this rule will be sent over the associated connection. Packets received on this connection will be sent to the transport layer Port in this SAP. |
| transport layer Port | The transport layer port must always be part of the matching criteria. |
| Number of Classification Parameters | The count of classification parameters that follow. Each classification parameter has a unique identifier and parameters that define the match criteria for that parameter. |
| Classification Parameter 1 | The first of the classification parameters |
| ... | ... |
| Classification Parameter N | The last of the classification parameters |

A classifier rule contains 0 or more classification parameters. Each classification parameter has a Parameter ID that identifies the field of interest in the packet and has a value that specifies the match criteria for that field. Classification parameters within a rule of different Parameter IDs (e.g. IP Destination Address and IP Destination Port) must all match (AND function) for the rule to be considered a match. At least one of the classification parameters with the same Parameter ID (e.g. 2 or more Destination IP Address parameters) must match (OR function) for that classification parameter to be considered a match. As an example, if there is one Destination IP Address classification parameter and two Destination IP Port classification parameters, then the Destination IP Address must match exactly but either Destination Port may match for the rule to be considered a match.

If no rule matches a message sent across a transport layer Port, then depending on value of Classifier Service in the CMIF_BIND_REQ primitive for that transport layer Port, the message will be discarded or the CM will be notified so that the CM can attempt to establish a new connection.

When a DEV receives a message from another DEV, the CID to which the transport layer message belongs is contained in the transport layer message. The classifier uses the CID to determine which transport layer Port the message will be delivered across. The CID to transport layer Port association is specified in the classifier rules. If the set of current classifier rules make multiple CID to transport layer Port associations, the action of the Classifier is implementation specific.

The AV Classifier allows only one type of classifier parameter in each rule. That classifier parameter is the Destination MAC Address. When a packet is supplied to the AV Classifier over the transport layer Port, its transport layer Port number and Destination MAC address determine the CID over which it will be sent.

As with the AV Classifier, the AVC Classifier allows for only one type of classifier parameter in each rule. That classifier parameter is the Destination MAC Address. When a packet is supplied to the AVC Classifier over the transport layer Port, its transport layer Port number and Destination MAC address determine the CID over which it will be sent.

The IP Classifier will send IP packets over the CID identified in the first rule that matches the packet. Each rule in the IP Classifier may have one or more classifier parameters as described in the following section.

| Parameter ID | Name | Values |
|---|---|---|
| 2 | IP Source address | SrcValue, SrcMask. Where a match is when the SrcValue = ([the packet's source MAC address] AND SrcMask) |
| 3 | IP Destination address | DstValue, DstMask. Where a match is when the DstValue = ([the packet's destination MAC address] AND DstMask) |
| 4 | IP Source Port | SrcPort, SrcMask. Where a match is when the SrcPort = ([the packet's source IP port] AND SrcMask) |
| 5 | IP destination Port | DstPort, DstMask. Where a match is when the DstPort = ([the packet's destination IP port] AND DstMask) |
| 6 | IP Protocol | Protocol number (0 . . . 65535) |
| 7 | IP Type of Service | High, Low, Mask. Where a match is when Low <= ([the packet's IPv4 Type of Service] AND Mask) <= High |
| 8 | IP Flow Label | High, Low , Mask. Where a match is when Low <= ([the packet's IPv6 Flow Label] AND Mask) <= High |

As with the AV Classifier, the ARP Classifier allows only one type of classifier parameter in each rule. That classifier parameter is the Destination MAC Address. When a message is supplied to the ARP classifier over the transport layer Port, its transport layer Port number and Destination MAC address determine the CID over which it will be sent.

The 802.2 CLASSIFIER will send packets over the CID identified in the first rule that matches the packet. Each rule in the 802.2 classifier may have one or more classifier parameters as described in the following section.

| Classification Parameter ID | Name | Values |
|---|---|---|
| 0 | Source MAC address | SrcValue, SrcMask. Where a match is when the source MAC address = (SrcValue AND SrcMask) |
| 1 | Destination MAC address | DstValue, DstMask. Where a match is when the DstValue = ([the packet's destination MAC address] AND DstMask |
| 9 | SSAP | The SSAP value. (0..255) |
| 10 | DSAP | The DSAP value. (0..255) |
| 11 | Protocol | The SNAP Protocol DSAP = 0xAA). (0 ... 65535) |

The 802.2 Classifier is also able to detect IP Packets encapsulated within 802.2. As such, the IP classification parameters are available to the 802.2 classifier.

The data identified by its classifier is mapped to its appropriate connections 38 and transport functions 36 ensue. The transport layer interfaces with the upper MAC addressing functions through the UMAC SAP 322. As MAC addresses are the unique identifier for each device, this ensures that the messages are appropriately routed to the MAC layer 32 and eventually to the respective devices.

The connection manager (CM) the central coordinator (CC) and the bearer manager that manages the bearing channels, (BM), are contained in the control plane 20, to coordinate and manage the entire PLC communication system. The connection manager generates the connection type and the connection specification.

The CSPEC is unique to the connection Type. The message format for the CSPEC is:

| Octets:1 | 2 | 2 | 1 | 1 | 1 | 1 | n |
|---|---|---|---|---|---|---|---|
| CSPEC Length | connection ID (CID) | connection Info (CINFO) | Num. Dest. DEVs. | Orign TEI Orig | Dest. TEI/ MCAST Group | CTYPE | CSPEC Fields |

The connection information field (CINFO) provides information from the transport layer to the MAC layer describing the functions that the MAC must perform on the packets belonging to a particular connection. The particular connection is identified by the CID that is associated with the CINFO field in the CSPEC. The format of the CINFO field is as follows:

| | b7 b0 |
| | B15 b8 |

| Bit in CINFO | Function | Description |
|---|---|---|
| 1-0 | ACK/ Retransmission Policy | 00—No ACK<br>01—transport layer Retransmissions requested<br>10—LMAC Retransmissions requested (ACK required)<br>11—Both transport layer and LMAC Retransmissions requested |

-continued

| | b7 b0 |
| | B15 b8 |

| Bit in CINFO | Function | Description |
|---|---|---|
| 2 | Multiplexing | MUX Policy: This determines if the connection can share bandwidth assigned to it by the central coordinator with other connections or Control Logical Channels.<br>0 = No<br>1 = Yes |
| 3 | Concatenation | Concatenation: The connection can request packet concatenation in the transport layer<br>0 = No<br>1 = Yes |
| 4 | Fragmentation | Fragmentation: The connection can request packet fragmentation in the transport layer<br>0 = No<br>1 = Yes |
| 5 | In-Sequence Delivery | transport layer requests UMAC at receiving node to deliver packets in-order to the transport layer.<br>0 = Delivery Order Unimportant<br>1 = Deliver In Order |
| 6 | Compensation | 0 = No Compensation requested by transport layer at destination.<br>1 = Source DEV requests Destination transport layer to activate the Compensation Function |
| 7 | Encryption | 0 = No Encryption required<br>1 = Encryption requested from MAC |
| 8 | Response Request | 0 = No Transmission Status required from UMAC<br>1 = Transmission Status requested from UMAC |
| 9 | QoS Monitoring | 0 = QoS Monitoring not required<br>1 = QoS Monitoring required by Source and Destination DEVs. |

-continued

| | b7 b0 |
| | B15 b8 |

| Bit in CINFO | Function | Description |
|---|---|---|
| 11-10 | TypeCast | 00 = Uni-Cast (Point to Point connection)<br>01 = Multi-Cast (Point to Multipoint connection)<br>10 = BroadCast (Broadcast connection)<br>11 = Reserved |
| 12 | transport layer Message Format | 0 = transport layer Message Format 1<br>1 = transport layer Message Format 2 |
| 15-13 | Reserved | |

The different fields in the CSPEC Format include the CID, the globally unique identifier assigned by the CC. It may be a combination of 8-bit connection Handle, which is a local identifier whose scope is limited to the device, and 8-bit Source TEI. Source is the device originating a connection request. TEI or MAC Address is a globally unique identifier for the device assigned by the CC.

The acknowledgement policy field may have values as follows: 00-No ACK, 01-ACK, 10-Burst ACK, 11-TBD. Similarly, the multiplexing policy (MUX) determines if the connection can share bandwidth assigned to it by the CC with other connections or control channels. (1—Yes 0=No). The connection can request packet concatenation in the Upper MAC (1—Yes 0=No). In-Sequence delivery specifies that the connection require the MAC layer to perform re-ordering of packets belonging to a particular CID and deliver those packets in-sequence to the Transport Layer at the receiving device. (1—Yes 0=No). CTYPE is that discussed above. Each bit in Field MAP determines if a certain field or parameter is present in the CSPEC. 0=> not present 1=> present, and the connection's QoS requirement and traffic characteristics are included in the fields. The table below lists the specifics of each portion of the CSPEC.

| CSPEC Field | FID | Field Definition | CGS | PGS | APGS |
|---|---|---|---|---|---|
| Delay Bound | 00 | Max. time delay to transport an application packet from transport layer of source DEV to transport layer of destination DEV. | | | |
| Forward | | | M | M | O |
| Reverse | | | M | M | O |
| Jitter Bound | 21 | Max. difference in the delay experienced by transport layer messages, measured from the time of creation of the transport layer message at the source DEV to the time of delivery of the message at the Destination DEV. | | | |
| Forward | | | M | M | O |
| Reverse | | | M | M | O |
| Min. Data Rate | 22 | The minimum bandwidth in bps required for transport of transport layer messages belonging to this connection. | | | |
| Forward | | | M | M | O |
| Reverse | | | M | M | O |
| Max. Data Rate | 33 | The maximum bandwidth in bps required for transport of transport layer messages belonging to this connection | | | |
| Forward | | | O | O | O |
| Reverse | | | O | O | O |
| Schedule Duration | 44 | Time duration for which the requested BW allocation and this CSPEC are valid. 0 means Allocation and CSPEC are valid indefinitely until connection is reconfigured or terminated. | | | |
| Forward | | | M | M | M |
| Reverse | | | X | X | X |
| Min. TXOP Size | 55 | Min. acceptable size of a TXOP. TXOP size is defined as the size of the BW allocated every time the DEV is allowed to transmit on the PHY medium i.e., when the DEV is not allowed to transmit continuously but in bursts called Transmit Opportunities (TXOP), TXOP size defines the quantum of BW allowed in each burst. | | | |
| Forward | | | X | M | M |
| Reverse | | | X | M | M |
| Max. TXOP Size | 66 | Max. acceptable size of a TXOP. | | | |
| Forward | | | X | O | O |
| Reverse | | | X | O | O |
| Min. Inter-TXOP Gap | 77 | Min. Time acceptable between two TXOPS | | | |
| Forward | | | X | O | O |
| Reverse | | | X | O | O |
| Max. Inter-TXOP Gap | 88 | Max. Time acceptable between two TXOPS | | | |
| Forward | | | X | M | O |
| Reverse | | | X | M | O |
| Average Burst Size | 99 | Average size of a single contiguous burst of data generated by the application that is framed in transport layer messages and delivered to the UMAC at the source DEV. This influences the size of BW grants and the rate at which request-grant messages are generated. | | | |
| Forward | | | X | O | O |
| Reverse | | | X | O | O |
| Max. Burst Size | 110 | Maximum size of a single contiguous burst of data generated by the application, that is framed in transport layer messages and delivered to the UMAC at the source DEV. | | | |
| Forward | | | X | O | O |
| Reverse | | | X | O | O |
| Max. Packet Size | 111 | The maximum size of an application packet delivered to the transport layer by an application | | | |
| Forward | | | O | O | O |
| Reverse | | | O | O | O |

-continued

| CSPEC Field | FID | Field Definition | CGS | PGS | APGS |
|---|---|---|---|---|---|
| Fragment Size | 112 | This is the maximum size of the payload in a transport layer message when it is set to less than the Max. transport layer Format 1 payload size of 1515 bytes This field must be specified only if the Fragmentation bit is set to 1 in the CINFO field. | | | |
| Forward | | | O | O | O |
| Reverse | | | O | O | O |
| Observation Interval | 113 | Time period during which parameters in the CSPEC are measured. | | | |
| Forward | | | O | O | O |
| Reverse | | | O | O | O |
| Violation Policy | 114 | The DEV informs identifies the field that is being violated and species the violation policy. TBD | | | |
| Forward | | | O | O | O |
| Reverse | | | O | O | O |
| Inactivity Interval | 115 | The maximum duration of time a connection is allowed to remain inactive without transporting any application data | | | |
| Forward | | | O | O | O |
| Reverse | | | X | X | X |
| Outstanding Request Duration | 116 | The maximum time a request for BW may be queued without response by the CBWM before the connection may resend a request | | | |
| Forward | | | O | O | M |
| Reverse | | | O | O | O |
| Reserved | 17-31 | Reserved | X | X | X |

CGS is continuous grant service, PGS is periodic grant service, APGS is aperiodic grant service, and O is optional, M is mandatory and X is not required.

CSPEC fields are coded using the format shown below. It consists of a 1-Byte Field Identifier, followed by 1 to 4 bytes of field data.

| b7 | b6 | b2 | b1 | b0 |
|---|---|---|---|---|
| F/R (1b) 1—Fwd. 0—Rev. | FID (5b) | | Field Length (2b) | |
| Field Data Octet 1 | | | | |
| Field Data Octet 2 | | | | |
| ... | | | | |
| Field Data Octet N | | | | |

The combination of the Forward/Reverse (F/R) bit with the Field ID (FID), allows the receiver to identify each field. Fields are placed in the CSPEC in increasing numerical order of their combined F/R bit and FID field. Thus, all FIDs defining the Reverse direction appear before the FIDs defining the Forward direction. This allows the receiver to determine if a field is present within the CSPEC. FIDs are defined below.

| CSPEC Field | FID | No. of Octets | Units |
|---|---|---|---|
| Delay Bound | 0 | 4 | Microsecs |
| Jitter Bound | 1 | 4 | Microsecs |
| Min. Data Rate | 2 | 4 | Bits per second |
| Max. Data Rate | 3 | 4 | Bits per second |
| Schedule Duration | 4 | 4 | Millisecs |
| Min. TXOP Size | 5 | 4 | Bytes |
| Max. TXOP Size | 6 | 4 | Bytes |
| Min. Inter-TXOP Gap | 7 | 4 | Microsecs |
| Max. Inter-TXOP Gap | 8 | 4 | Microsecs |
| Average Burst Size | 9 | 4 | Bytes |
| Max. Burst Size | 10 | 4 | Bytes |
| Max. Packet Size | 11 | 2 | Bytes |

-continued

| CSPEC Field | FID | No. of Octets | Units |
|---|---|---|---|
| Fragment Size | 12 | 2 | Bytes |
| Observation Interval | 13 | 4 | Microsecs |
| Violation Policy | 14 | 1 | Violation policies TBD |
| Inactivity Interval | 15 | 4 | Microsecs |
| Outstanding Request Duration | 16 | 4 | Microsecs |
| Reserved | 17-31 | | |

When an AV application initiates a new traffic flow or when the Classifiers of FIG. 2 determines that a connection does not exist and informs the CM, the CM has to establish a connection. An important step in connection establishment is the identification of what type of PLC connection (CTYPE) is appropriate for the particular application. Based on the CTYPE determination, the CSPEC also needs to be generated.

The CTYPE identification of AV (AV) and AV-Control (AV/C) information can be done based on the identity of the Service Access Point (SAP) being used by the particular application. Alternately, the CTYPE identification can be made based on the primitives received by the Transport System from the AV or AV-C application requesting the establishment of a peer-peer AV traffic flow. For IP traffic, the IP Classifier (IP-C) looks into the Classification Table to check for an existing mapping of the connection ID (CID) to IP parameters specific to a particular IP application. If such a mapping does not exist, the IP-C provides the CM with the IP parameters and requests a CID mapping. The CM examines these IP parameters that include (but are not limited to), source and destination IP addresses and TCP/UDP port numbers that uniquely identify the type of IP application, to determine the CTYPE for the application. The TCP/UDP port numbers can identify VoIP and H.323 applications that may be mapped into ISO-IP CTYPE.

Certain parameters in the CSPEC are relevant to MAC or CC operations. The Schedule Duration parameter is set to 0 when the connection requires a continuous allocation of BW indefinitely. CTYPE ISO AV (0001) and Async. AV-C (0000) and ISO IP (0010) use this value. This parameter informs the CC how long the BW allocation made by the CC to the connection is likely to last of if the CC can provide bursty service to the connection. The ACK Policy parameter is always set to 1 for CTYPEs 0000 and 0001. IP Packets can be ACKed or not depending on how reliable the channel must be to support the IP application. For e.g. FTP and H.323 sessions might be Acknowledged while WWW sessions might not. The CM makes this determination based on the specific IP application. The Multiplexing parameter is always set to 0 only when the delay/jitter requirements of the connection can be met by an allocation even when packets from other connections and/or Control traffic are multiplexed to use the same BW allocation as the original connection.

When CSPEC parameters are being violated, the CM can communicate with the CC and change the MUX. Option to prevent other flows sharing the BW with the connection. In-order packet delivery is turned on for CTYPE 0000 and 0001, and is optional for IP traffic based on the IP application. Concatenation is turned on when the ratio of Average Packet Size/Max packet Size is <<1 for the particular application.

Other parameters in the CSPEC are application specific such as the delay, jitter, data rates, burst sizes and TXOP parameters. These values may be determined by the CM upon identifying the application or by the application communicating these values to the CM.

As mentioned above, the classifiers 440 of FIG. 2 may perform packet classification. In a classification scheme, the classifier maps incoming application data packets into a connection. If no such connection exists, the classifier may request a connection from the connection manager. This will be discussed with regard to FIG. 4. The classifier's complexity and performance depends upon a number of factors including: the number of connections handled by the device; the traffic characteristics of the connection; the depth of classification, which is the number of fields in the packet header used for classification; and the QoS attributes of the traffic stream.

Figure 5:
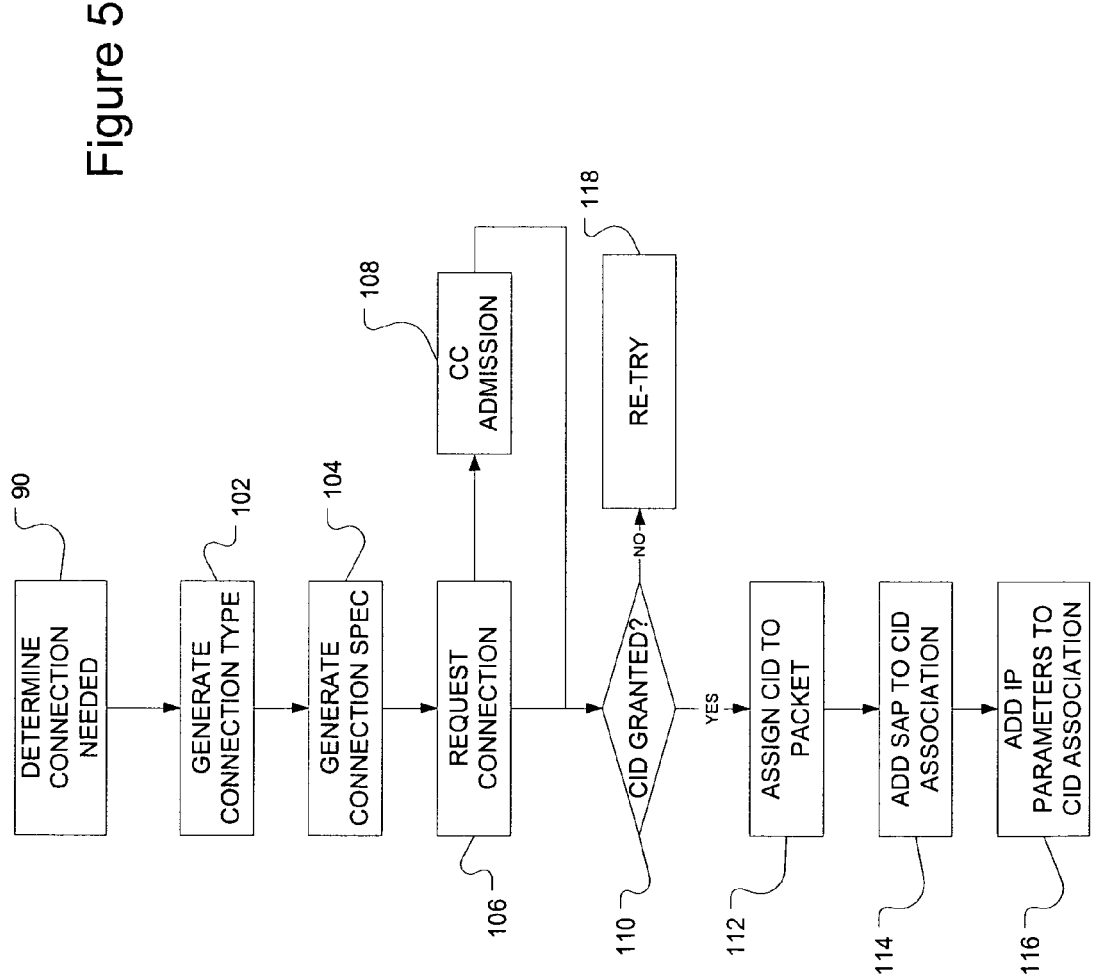
FIG. 5 shows a flowchart of an embodiment of a method to establish connections in a centralized communication system.

The general process of connection establishment is shown in FIG. 5. At 90 the determination is made that a connection is needed. This may occur by a specific request from an application, or by the connection manager determining that no match exists in the classification process. The connection type is generated at 102 and the connection specification is generated at 104. These key parameters for the connection are discussed in detail below.

If no connection already exists, the transport system may be generated automatically by the transport system. The transport system generates the CSPEC and CTYPE and then establishes the connection. The generation of CSPEC is based upon information and/or fields contained within the protocols encapsulating the application data, as well as the SAP used by the application. The transport layer may also monitor the particular application data stream to determine QoS requirements and later modifying it, even if the application data stream is active.

As mentioned before, in one embodiment of the invention there are 3 different types of connections: continuous grant service (CGS); periodic grant service (PGS); and priority aperiodic grant service (PAGS). Generally, a continuous grant connection is one that continuously monitors or utilizes the connection such as HDTV, SDTV or audio. A periodic grant service would be used for isochronous application such as Voice of Internet Protocol (VoIP). Priority aperiodic grant service might be used by high priority traffic, such as control protocols for audio-video such as IEEE 1394 "firewire" audio-visual control specifications, or low priority best effort IP applications such as the worldwide web and the file transfer protocol. Each of these types of connections goes through a slightly different connection process, embodiments of which are shown in FIGS. 6a-6c.

Figure 6A:
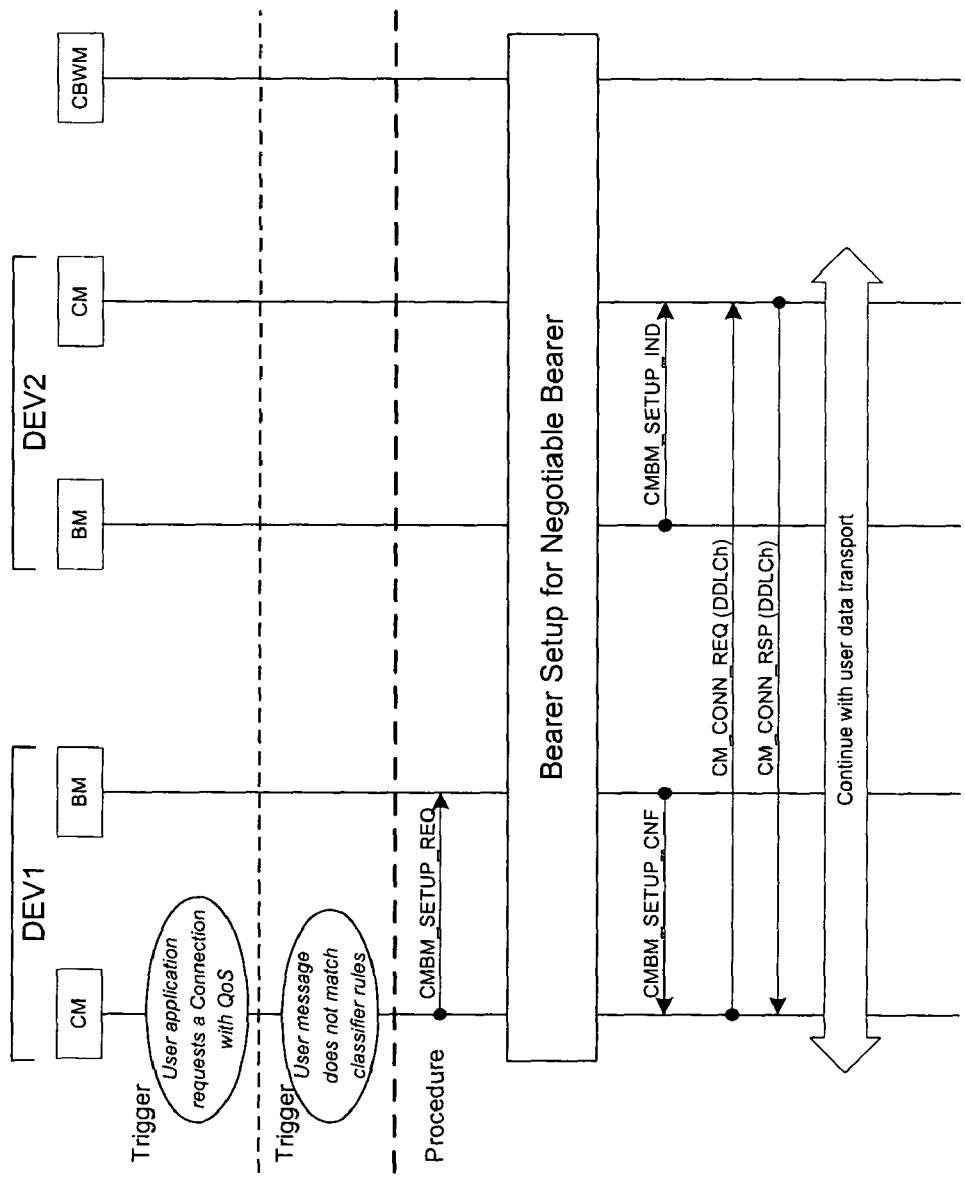
FIGS. 6a-6c show embodiments of message flow diagrams for connection establishment for different connection types.
Figure 6B:
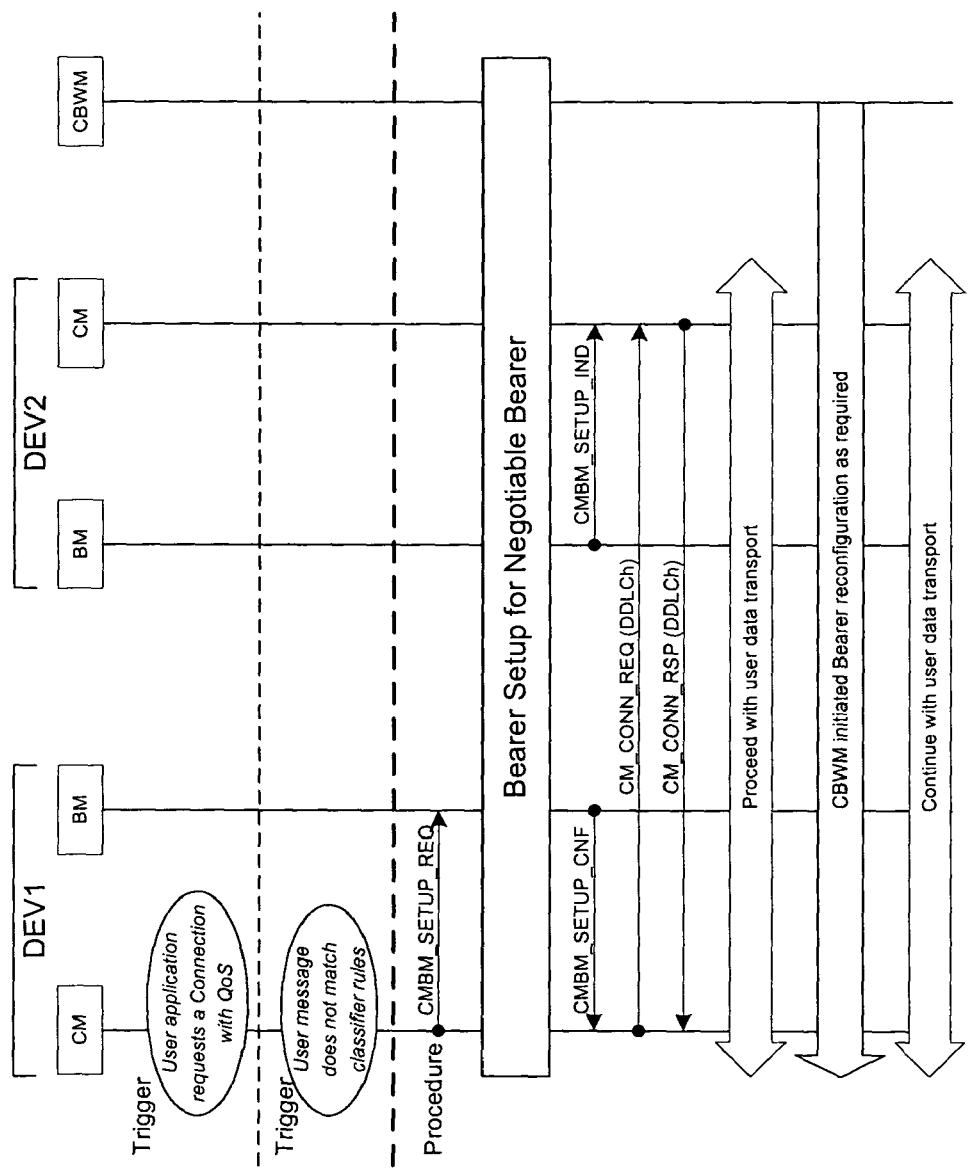
Figure 6C:
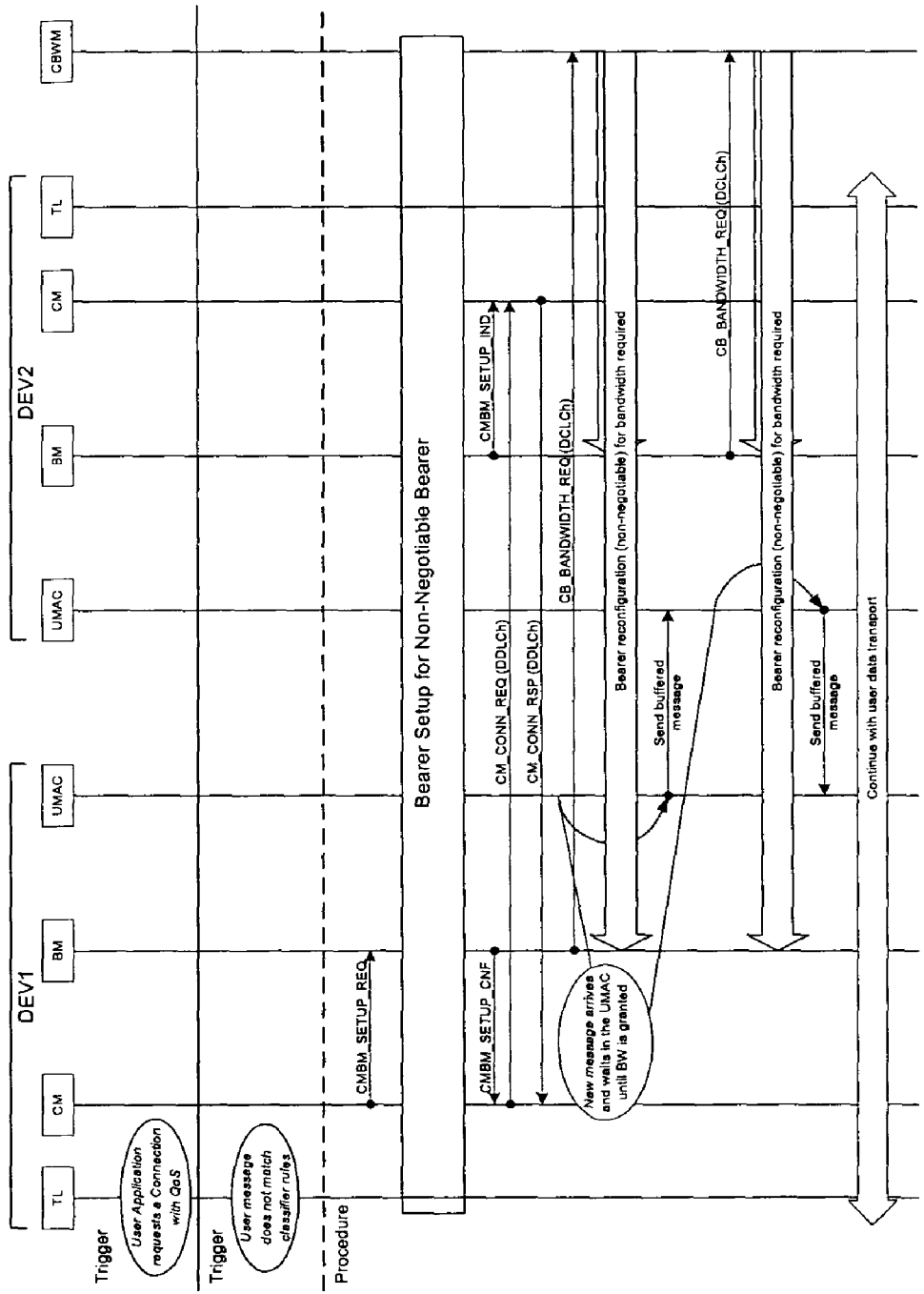

As can be seen in FIG. 6a, an embodiment of a connection process for CGS begins with a triggering event. As discussed with regard to 90 in FIG. 5, this is either the determination that no connection exists and needs to be established, or that a user application requests a connection. For ease of discussion, several abbreviations have been used in the drawings to designate the nature of the communication. These communications are referred to here as either primitives, which are communications between entities within a device, or messages, which are communications between entities on different devices. A primitive will generally have a four-letter designation, and messages a two-letter designation.

In FIG. 6a, the triggering event causes a primitive to be generated between the connection manager (CM) and the bearer manager (BM) on a device, CMBM_SETUP_REQ. The primitive requests a connection, generally assigning a temporary request ID that allows entities involved in the request to identify the request. The primitive may include identification of the originating and terminating devices for the connection, the QoS requirements.

At this point in the establishment process, the devices perform a process of bearer setup. Bearers may be negotiable, meaning that the two devices will negotiate the modulation tones used, or non-negotiable, meaning that the bearer channel will be set up with a predetermined modulation. In the embodiment of FIG. 6a, a negotiable bearer is used, as will typically happen with CGS connections.

At the conclusion of the bearer setup, the BM on each device transmits a setup confirmation message (CMBM_SETUP_CNF) to the CMs on their respective devices. The CM on the originating device then requests a connection from the CM on the terminating device (CM_CONN_REQ, where CM designates it as a message between CMs of different devices), and a connection response is returned (CM_CONN_RSP). These messages may be exchanged on the device to device logical channel (DDLch). The connection having been established, the process continues with user data transport on the CGS channel with a continuous bandwidth allocation.

An embodiment of the connection establishment for PGS is shown in FIG. 6c, the process again begins with a triggering event, and the setup request and confirmation primitives between the BM and CM on each device to set up the bearer, in this example a negotiable bearer. The CM connection request and response are then completed and user data transport begins. In this instance, however, the central bandwidth manager (CBWM), an entity that resides on whichever device is functioning as the central coordinator, may reconfigure the channel as needed.

FIG. 6c shows on embodiment of a connection establishment for a FAGS connection. The triggering event again starts the CM and BM primitive exchanges, except that the bearer set up is now non-negotiable. After the two CMs request the connection and respond, the CM on the non-central coordinator device, in this case Device 1, requests a bandwidth allocation (CB_BANDWIDTH_REQ). The bearer is then configured with the required bandwidth. Any messages arriving in the Upper MAC (UMAC) of Device 1 is buffered there until the bearer is granted. Once the bearer is granted, the message is sent. The CM on Device 2, also a non-central coordinator device, then requests bandwidth allocation as well. The bearer is then configured for device 2. Any buffered messages are then sent from Device 2 once the bearer is configured and the process continues for user data transport. This procedure, referred to here as a request-grant procedure is notably different from the continuous grant procedure for CGS.

Figure 7A:
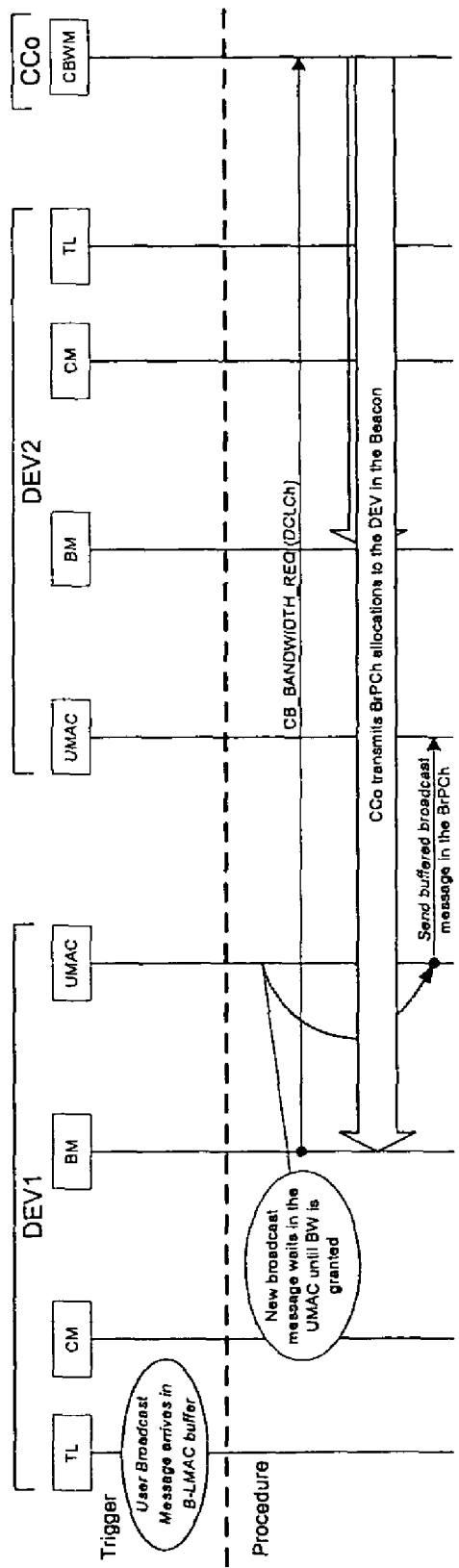
FIGS. 7a-7b show embodiments of message flow diagrams for multicast connection establishment and broadcast bandwidth requests.

In addition to procedures that may occur based upon the type of connection, further procedures may be required for multicast and broadcast messages. Broadcast messages will typically be of two types. Short broadcast messages may be transmitted on a dedicated broadcast channel. For short broadcast messages, an example of a setup progression is shown in FIG. 7a. The device is requesting 'space' on the broadcast channel and the central coordinator allocates a size and location of a broadcast opportunity within the frame.

The user application generates a broadcast message that appears in the broadcast lower MAC (B-LMAC) buffer. The central coordinator responds with the allocations, typically in the beacon channel. When the device transmits its broadcast message, the receiving devices may transmit a partial acknowledgement message to the broadcasting device. The broadcasting device would then determine how many, if any, of the devices received the broadcast and whether or not to re-try the transmission. The devices on the network other than the source device would receive the message on the broadcast channel in transport layer Format 2, which further indicates that it is a broadcast message. The short broadcast messages include any information needed for the destination devices to process the data enclosed in the message.

Figure 7B:
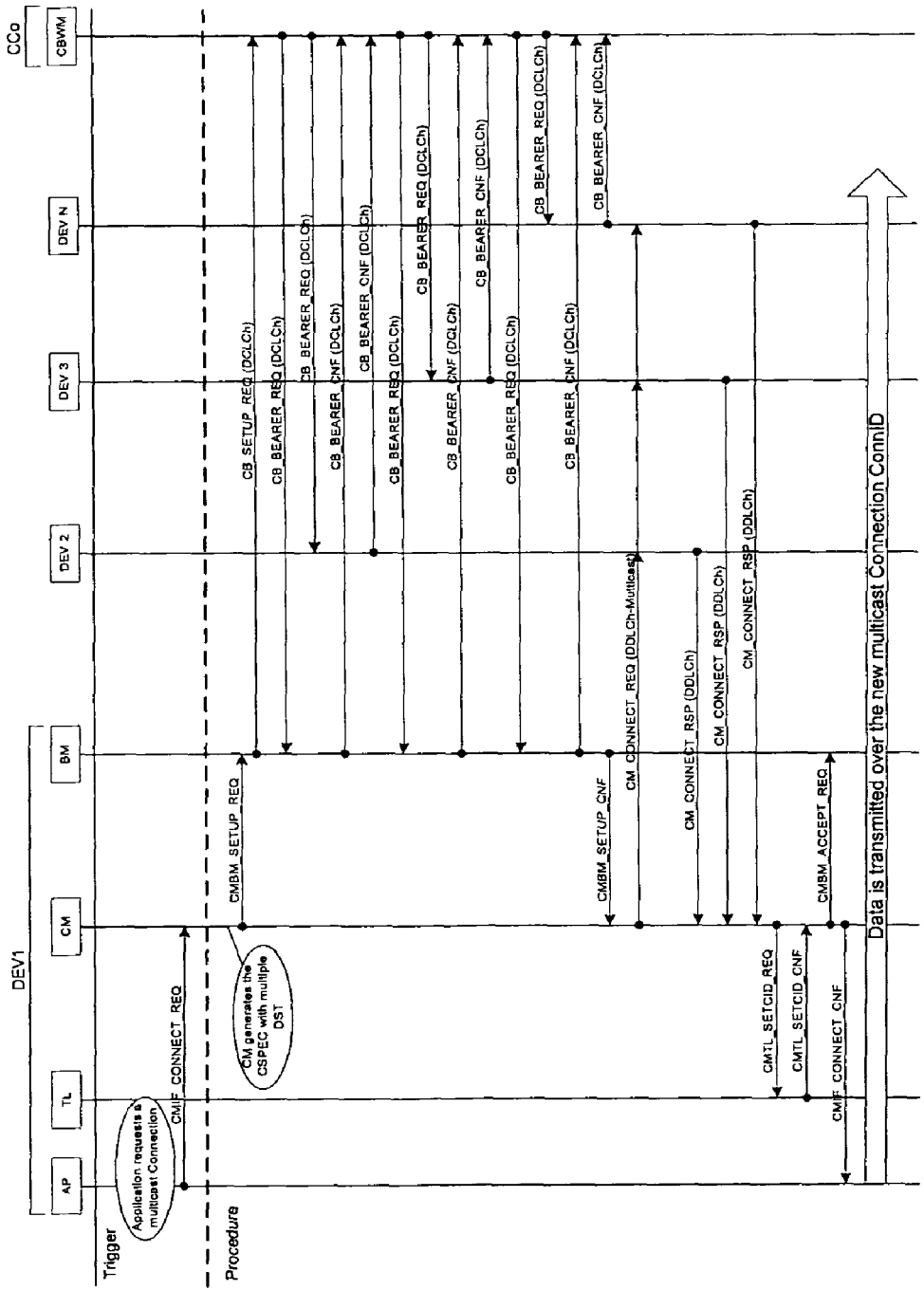

For longer broadcast messages, it would be advantageous to use the same procedure of channel setup as used for multicast transmission. An example of this is shown in FIG. 7b. In FIG. 7a, the source device communications with the central coordinator across the dedicated device-central coordinator channel (DCLCh) requesting a point-to-multipoint connection. The addresses of the destination devices would be used to identify the multicast group. For a broadcast transmission, all destination devices would be included. For multicast transmission, less than all devices, but more than one, would be included.

The process of establishing a bearer channel between the source device and each device designated is repeated for each device. The BM on the source device requests bearer channel from the central coordinator (CB_BEARER_REQ). These bearer channels are then confirmed for each device (CB_BEARER_CNF). The setup is then confirmed and the source device transmits a connect request to each destination device (CM_CONNECT_REQ), and each device responds (CM_CONNECT_RSP). The CM then requests a CID from the transport layer, which is confirmed. The CM then informs the BM that the request has been accepted, and the connection is confirmed to the application layer (CMIF_CONNECT_CNF). Data is then transmitted across the new multicast connection. Generally, multicast is accomplished by creating multiple point-to-point connections and the source device replicates and transmits the application data on each connection to the destination.

Returning to FIG. 5, these processes occur in the broader descriptions of requesting a connection and it being granted at 106 and 108, respectively. The central coordinator admits the request at 108 and either grants it or not at 110. If the connection is granted, the central coordinator provides a global connection identifier (CID). If the connection is not granted, the process may continue re-trying for a grant at 118.

If the connection is granted, the CID is assigned to the packet, the originating SAP is also associated with the CID at 114. The predefined set of parameters is also associated with the CID, to be applied during classification of the packet, as mentioned previously at 116. The connection is now prepared to receive packets for transport, as well as the classification system and the SAP.

Figure 8:
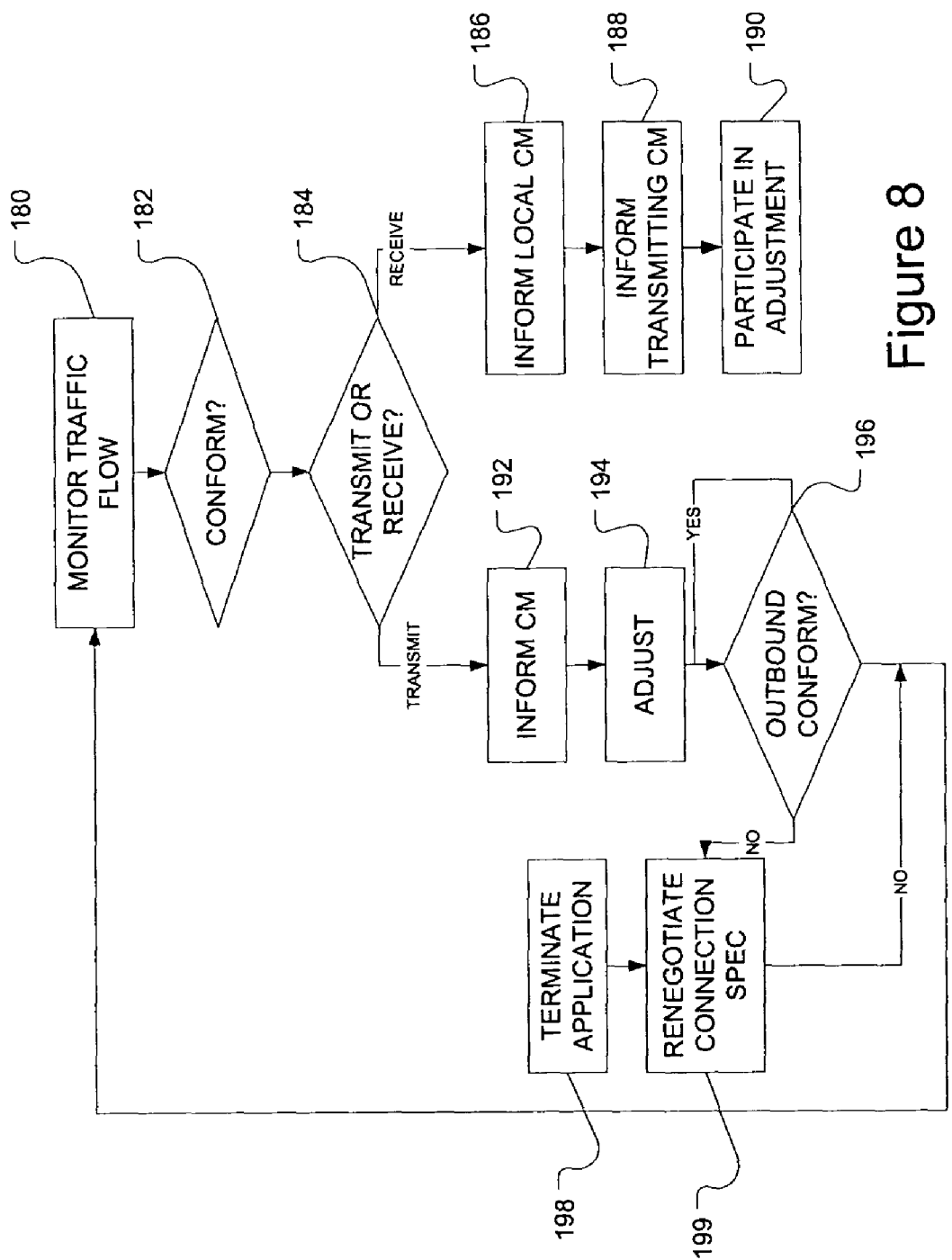
FIG. 8 shows a flowchart of an embodiment of a method to monitor a communication system.

Optionally, the QoS parameters such as delay and throughput for the particular CID are measured and compared with the parameter values defined in the CSPEC for the CID by the Monitoring sub-system. If used, monitoring functions are defined to police the QoS parameters and traffic attributes defined in the CSPEC, primarily the delay, maximum and minimum throughput parameters and to initiate remedial action when the CSPEC is violated. An embodiment of such a process is shown in FIG. 8.

The traffic flow is monitored at 180. This is done whether the device is on the transmitting or receiving ends. If the traffic does not conform to the attributes defined in the CSPEC, the process varies depending upon the role of the particular device. On the transmit side, the incoming traffic bursts must conform to the maximum and average burst size parameters. This may be accomplished by a Burst Size counter that maintains an additive count of all packets in a burst. Additionally, the average and maximum line rates of the incoming data must be within the limits specified in minimum and maximum data rates parameters requested by the connection in the CSPEC. The line rates can be computed by time averaging the burst size counts. The time stamps are used as a time reference.

On the receive side, traffic may be monitored by measuring the maximum and minimum delivery rates of Transport packets and compare these rates with the max./min Data Rate parameters in the CSPEC. The receiver may also Measure the average delay and jitter for each CID by averaging the delay (obtained from the packet received time and Time Stamp parameter in the Transport Header) and jitter over the Observation Interval specified in the CSPEC.

On the transmit side, if the traffic attributes of the connection are not compliant at 182, the monitoring system must inform the CM at 192 which then communicates with the application and either terminates the application flow at 198 or renegotiates a new CSPEC with the application and the Central Coordinator at 199 and then adjusts at 194. The monitoring system must also keep track of the outgoing traffic from the transport Layer at 196 and compute an estimate of the average, maximum and minimum rate of packet outflow. If these values do not lie within the range of the max./min data rate parameters in CSPEC, the CM may negotiate with the CC for a new allocation at 200. This is only a rough estimate since the buffering of transport frames in the MAC might contribute to additional delay.

In addition to the above methods, the monitoring system can measure the amount of time a connection remains inactive, where no packets are transmitted from the transport layer on a particular CID. If the Inactivity Interval is defined in the CSPEC, the monitoring system may inform the CM and the CM may proceed to teardown the particular connection, communicating with the CC and possibly, the application.

If the CSPEC parameters mentioned above are violated and the connection requires remedial action as specified under the Violation Policy parameter in the CSPEC, the monitoring system informs the CM in the receive Transport Layer, the local CM, at 186. This CM communicates with the peer CM in the transmit Transport Layer as well as the CC at 188. The CM originating the connection than take a number of remedial actions: negotiate with the CC for additional bandwidth; prevent multiplexing/sharing of BW between the connection and other connections and traffic Flows by informing the CC and MAC with a new CINFO field; and reconfigure the CSPEC and generate a new CSPEC for the application. The CM has to inform the peer CM and the CC of the changes in the CSPEC. A new BW allocation may also be necessary. The local CM then participates in the adjustment made by the transmitting CM at 190.

Figure 9:
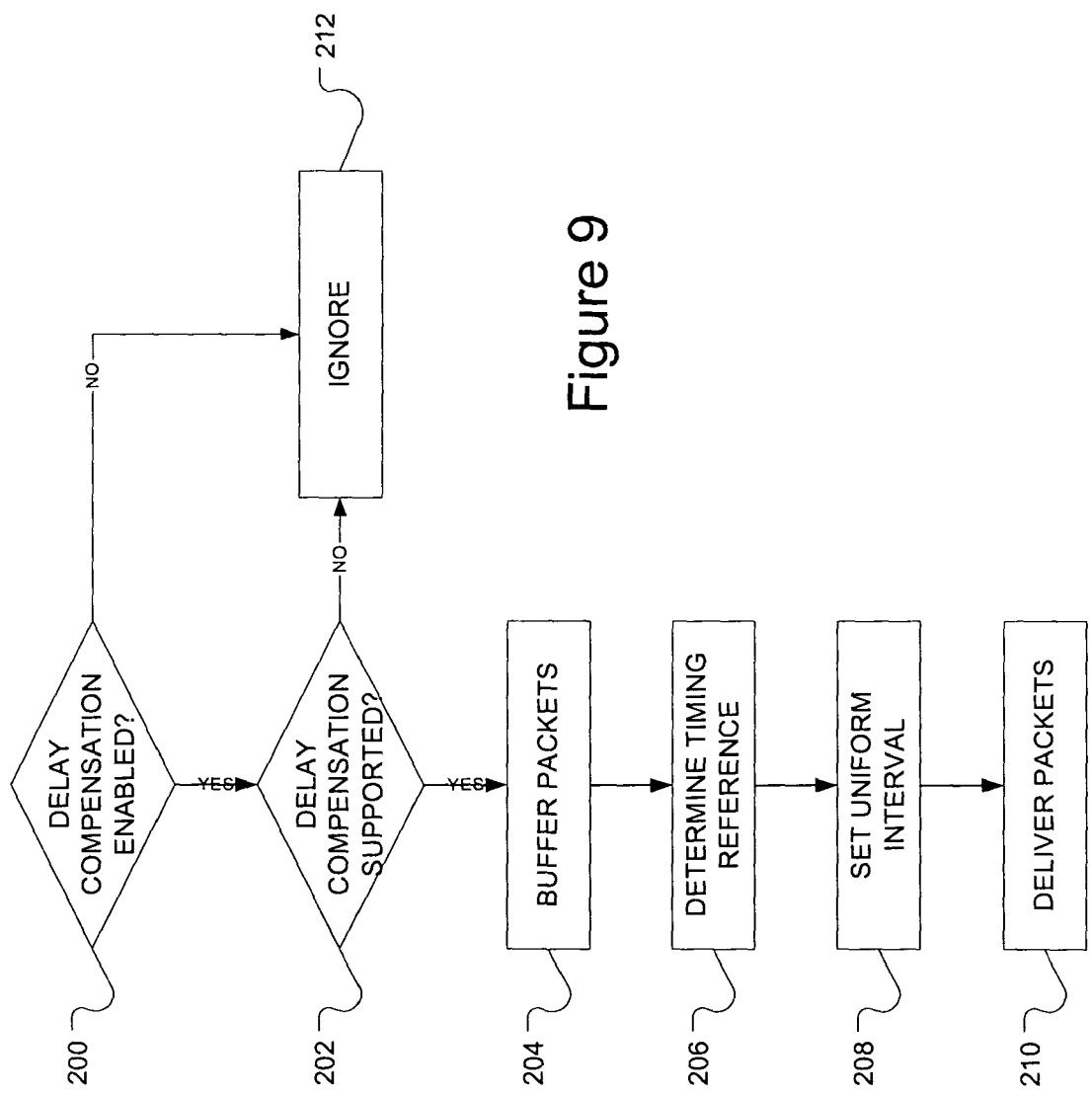
FIG. 9 shows a flowchart of an embodiment of a method to smooth delivery of packets in a centralized communication system.

In addition to monitoring the CSPEC, the communication system can alleviate jitter in real-time transmissions such as audio-video data, to maintain the QoS. An embodiment of this type of process is shown in FIG. 9. In order for delay compensation to alleviate jitter, it first must be enabled on the receiving device as confirmed at 200. If delay compensation is not enabled in the transmission at 200, the receiving device can ignore any delay compensation methods it may have. If the delay compensation is enabled in the transmission, the receiving device must support delay compensation before anything can be done with it. If it is not supported, the request is ignored at 202.

If delay compensation is enabled, the receiving device buffers the incoming packets for a particular connection at 204. A timing reference, such as a time stamp is determined at 206. A uniform delivery interval is then set at 208. Subsequent packets in this real-time data stream are then delivered at this predetermined interval at 210. This serves to smooth out the jitter that may be caused by the network during the data flow from the application across the network. This delay compensation is performed after all other transport layer functions have been completed, such as removal of headers, re-sequencing, de-concatenation or re-assembly of packets.

Thus, although there has been described to this point a particular embodiment for a method and apparatus for transporting data with quality of service requirements in a centralized network, it is not intended that such specific references be considered as limitations upon the scope of this invention except in-so-far as set forth in the following claims.

What is claimed is:

1. A method of converting application data to transport data in a power line communication system, the method comprising:
  receiving application data in a transport protocol layer from an application in a device through a service access point, the service access point being one of a plurality of service access points of the transport protocol layer;
  applying classifier rules associated with the service access point to the application data received through the service access point to determine if a connection through a lower protocol layer exists for the application data, including:
    determining if the application data matches matching criteria of a particular classifier rule; and
    if the application data matches matching criteria of the particular classifier rule, associating a globally unique connection identifier with the particular classifier rule, encapsulating the application data into a payload of a transport message, associating the globally unique connection identifier with the transport message and the service access point, and transmitting the transport messages through a connection of the power line communication system identified by the globally unique connection identifier of the particular classifier rule, wherein
  each classifier rule includes a priority;
  applying the classifier rules includes applying the classifier rules to the application data in an order defined by the priorities of the classifier rules;
  wherein the connection includes the globally unique connection identifier and a connection type selected from at least one of a continuous grant service (CGS) type, a period grant service (PGS) type, and a priority aperiodic grant service (PAGS) type; and
  the connection identifier is globally unique over the power line communication system and identifies the connection to which the transport message carrying the application data payload belongs; and
  transmitting through the connection includes transmitting through the connection having the selected connection type.

2. The method of claim 1, the method comprising automatically establishing a connection if none exists, comprising:
  generating a connection specification based upon the application data and the service access point; and
  establishing a connection based upon the connection specification; and
  encapsulating the application data into transport messages for that connection.

3. The method of claim 1, wherein receiving application data from an application further comprises receiving connection-oriented application data from the application.

4. The method of claim 1, wherein receiving application data further comprises:
  receiving connectionless application data from the application; and
  encapsulating the connectionless application data into transport messages for a power line communication system connection;
  wherein the power line communication system is connection-oriented.

5. A method of transmitting data on a network, the method comprising:
  receiving an incoming data packet from an application on a device at one of a plurality of service access points of a first protocol layer;
  classifying the data packet in the first protocol layer in a classifier associated with the service access point, including:
    determining an order of rules associated with the classifier to apply to the data packet, where each rule includes a rule priority, at least two of the rules include a same connection identifier, and where the order of rules is defined by the rule priorities of the classifier rules;
    applying the rules to the data packet in the order defined by the rule priorities of the classifier rules when the connection identifier is the same, including when applying a particular rule to the data packet:
      for each classification parameter of the rule, comparing a field of the data packet identified by a parameter ID of the classification parameter with a value of the classification parameter; and
      if for each classification parameter of the rule, a matching value is found in the data packet, associating a globally unique connection identifier with the service access point and the particular classifier rule, causing the packet to be associated with a connection associated with the globally unique connection identifier of the rule that is established at an interface between the first protocol layer and a second protocol layer, wherein the second protocol layer is a lower level protocol layer;
  routing the packet to the connection, wherein:
    the connection includes the globally unique connection identifier and a connection type selected from at least one of a continuous grant service (CGS) type, a period grant service (PGS) type, and a priority aperiodic grant service (PAGS) type; and the connection identifier is globally unique over the power line communication system and identifies the connection to which the packet belongs; and transmitting the data through the connection having the selected connection type.

6. The method of claim 5, the method comprising fragmenting the packet into smaller packets as needed based upon the packet size.

7. The method of claim 5, the method comprising fragmenting the packet into smaller packets as needed depending upon the bandwidth of the connection.

8. The method of claim 5, classifying the data packet further comprising determining if a connection exists for the packet, and requesting a connection if a connection does not exist.

9. A method of classifying data packets for transmission in a communication system, the method comprising:

analyzing an incoming data packet according to a plurality of sets of parameters, wherein the sets of parameters analyzed depends upon a type of service access point from which the data packet came, each set of parameters includes a priority, and the sets of parameters are used in analyzing the data packet according to an order defined by the priorities of the sets of parameters;

if the set of parameters in the data packet match a first set from the plurality of sets of parameters associated with a globally unique connection identifier and match a second set from the plurality of sets of parameters associated with the globally unique connection identifier, associating the globally unique connection identifier with the access point and the packet, and applying the first and second sets of parameters to the data packet in the order defined by the priorities of the sets of parameters when the globally unique connection identifier is the same for both the first and the second sets of parameters;

routing the data packet to a connection associated with the connection identifier, wherein:

the connection includes the globally unique connection identifier and a connection type selected from at least one of a continuous grant service (CGS) type, a period grant service (PGS) type, and a priority aperiodic grant service (PAGS) type; and the connection identifier is globally unique over the power line communication system and identifies the connection to which the packet belongs; and transmitting the data packet in the communication system through the connection having the selected connection type.

10. The method of claim 9, the method comprising transmitting parameters of the data packet to a connection manager if the parameters of the data packet do not match a predefined set of parameters.

11. The method of claim 5, wherein each rule comprises:
a connection identifier;
a transport layer port; and
at least one classification parameter, each classification parameter including a parameter ID and a value.

12. The method of claim 11, wherein for each rule associated with audio/visual application data, the rule includes only one classification parameter.

13. The method of claim 12, wherein:
for each rule associated with audio/visual application data, the classification parameter of the rule includes a destination address ID as the parameter ID.

14. The method of claim 1, wherein:
each classifier rule includes a priority; and
if multiple classifier rules include an identical connection identifier, applying the classifier rules includes applying the classifier rules including the identical connection identifier to the application data in an order defined by the priorities of the classifier rules including the identical connection identifier.

15. The method of claim 1, wherein:
each classifier rule includes at least one classification parameter;
each classification parameter includes a parameter identification and a value; and
the parameter identification identifies a field in the application data for comparison with the associated value.

16. The method of claim 15, wherein for a classifier rule having a plurality of classification parameters with identical parameter identifications, determining that the application data matches the classification parameters with the identical parameter identifications if the application data matches at least one of the classification parameters with the identical parameter identifications.

17. The method of claim 1, wherein the connection having the CGS type is one in which the connection is continually monitored or used, the PGS type is one in which the connection is used for isochronous applications, and the PAGS type is one in which the connection is used for high-priority traffic and low priority best effort applications.

18. The method of claim 1, further comprising connecting the application to the connection using one of at least three different connection processes, each connection process corresponding to one of the at least three connection types.

* * * * *